(12) United States Patent
Lepan et al.

(10) Patent No.: US 10,641,357 B2
(45) Date of Patent: May 5, 2020

(54) PLANETARY GEAR SET ADVANTAGEOUSLY FOR A SERVOMOTOR SYSTEM AND SERVOMOTOR SYSTEM USING THIS PLANETARY GEAR SET

(71) Applicant: BERNARD CONTROLS, Gonesse (FR)

(72) Inventors: Rémy Lepan, Boran-sur-Oise (FR); Yoann Denis, Montry (FR)

(73) Assignee: BERNARD CONTROLS, Gonesse (FR)

( * ) Notice: Subject to any disclaimer, the term of this patent is extended or adjusted under 35 U.S.C. 154(b) by 40 days.

(21) Appl. No.: 15/685,165

(22) Filed: Aug. 24, 2017

(65) Prior Publication Data

US 2018/0298987 A1 Oct. 18, 2018

(30) Foreign Application Priority Data

Apr. 14, 2017 (FR) .................................... 17 53278

(51) Int. Cl.
| | |
|---|---|
| *F16H 1/28* | (2006.01) |
| *F16K 31/53* | (2006.01) |
| *F16K 31/04* | (2006.01) |
| *F16H 57/033* | (2012.01) |
| *F16H 57/08* | (2006.01) |

(52) U.S. Cl.
CPC ............ *F16H 1/2845* (2013.01); *F16H 1/28* (2013.01); *F16H 57/033* (2013.01); *F16H 57/08* (2013.01); *F16K 31/047* (2013.01); *F16K 31/53* (2013.01); *F16H 2001/2881* (2013.01)

(58) Field of Classification Search
CPC ........................................................ F16H 3/005
USPC .......................................................... 475/294
See application file for complete search history.

(56) References Cited

U.S. PATENT DOCUMENTS 7,510,495 B2 * 3/2009 Nagai ....................... F16H 3/54
 475/263
2014/0135165 A1 5/2014 Kruselburger

FOREIGN PATENT DOCUMENTS

| CH | 351841 | 3/1961 |
|---|---|---|
| EP | 1869343 B1 | 8/2014 |
| JP | 2014181798 A | 9/2014 |
| JP | 2016020730 | 2/2016 |
| RU | 2614555 C2 | 3/2017 |

OTHER PUBLICATIONS

National Institute of Industrial Property, French Preliminary Research Report and Written Opinion in Application No. FR1753278, dated Jan. 2, 2018.

* cited by examiner

*Primary Examiner* — Derek D Knight
(74) *Attorney, Agent, or Firm* — Cantor Colburn LLP

(57) ABSTRACT

A planetary gear set, for a servomotor system, and including rotary components mounted in at least one assembly configuration, within a case, and producing a speed ratio of the planetary gear set, which is determined by this assembly configuration, between an input member and an output member. The rotary components allow changes in assembly configuration. Each assembly configuration produces a specific predetermined speed ratio. The invention is usable for servomotor systems.

9 Claims, 19 Drawing Sheets

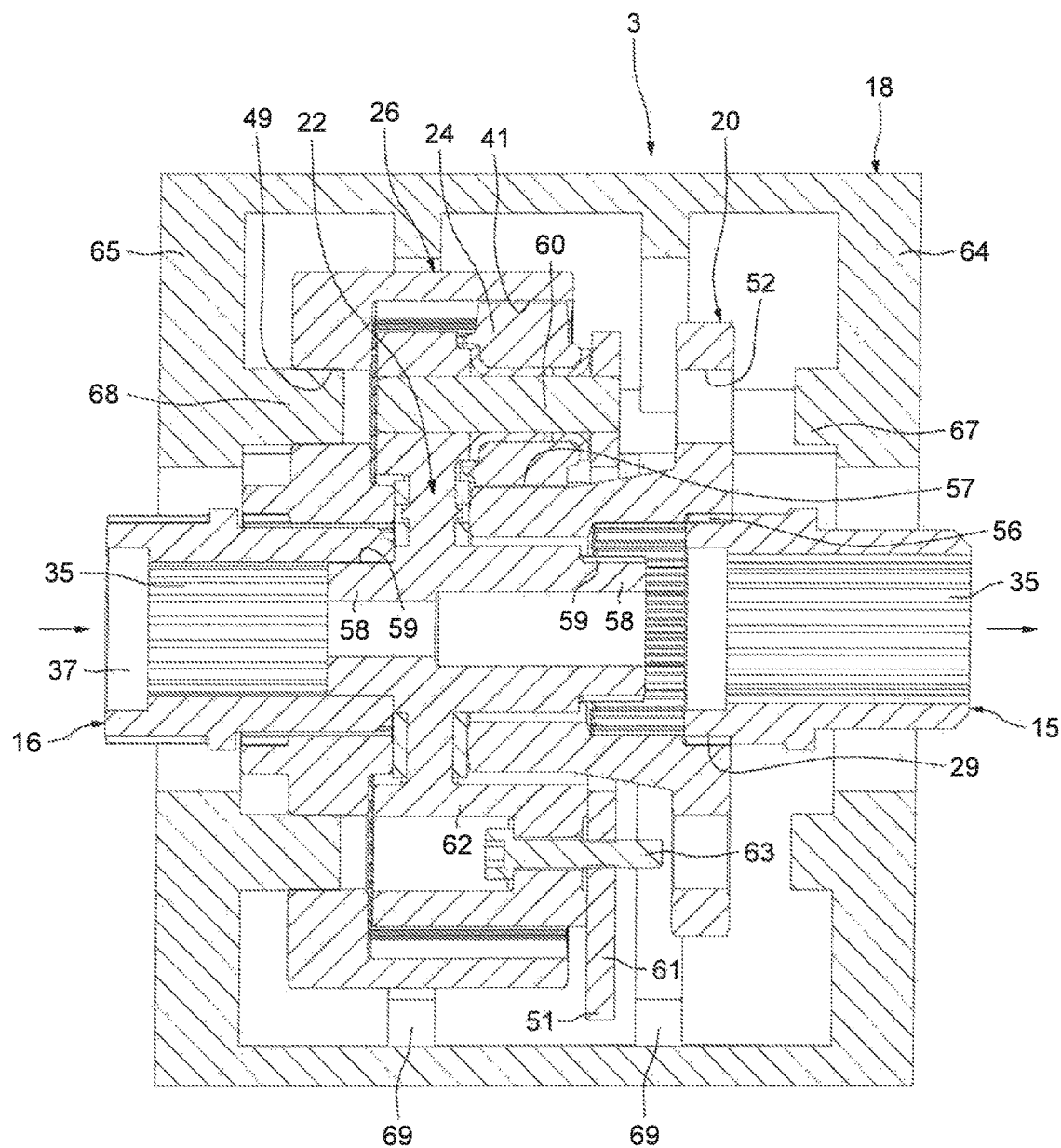

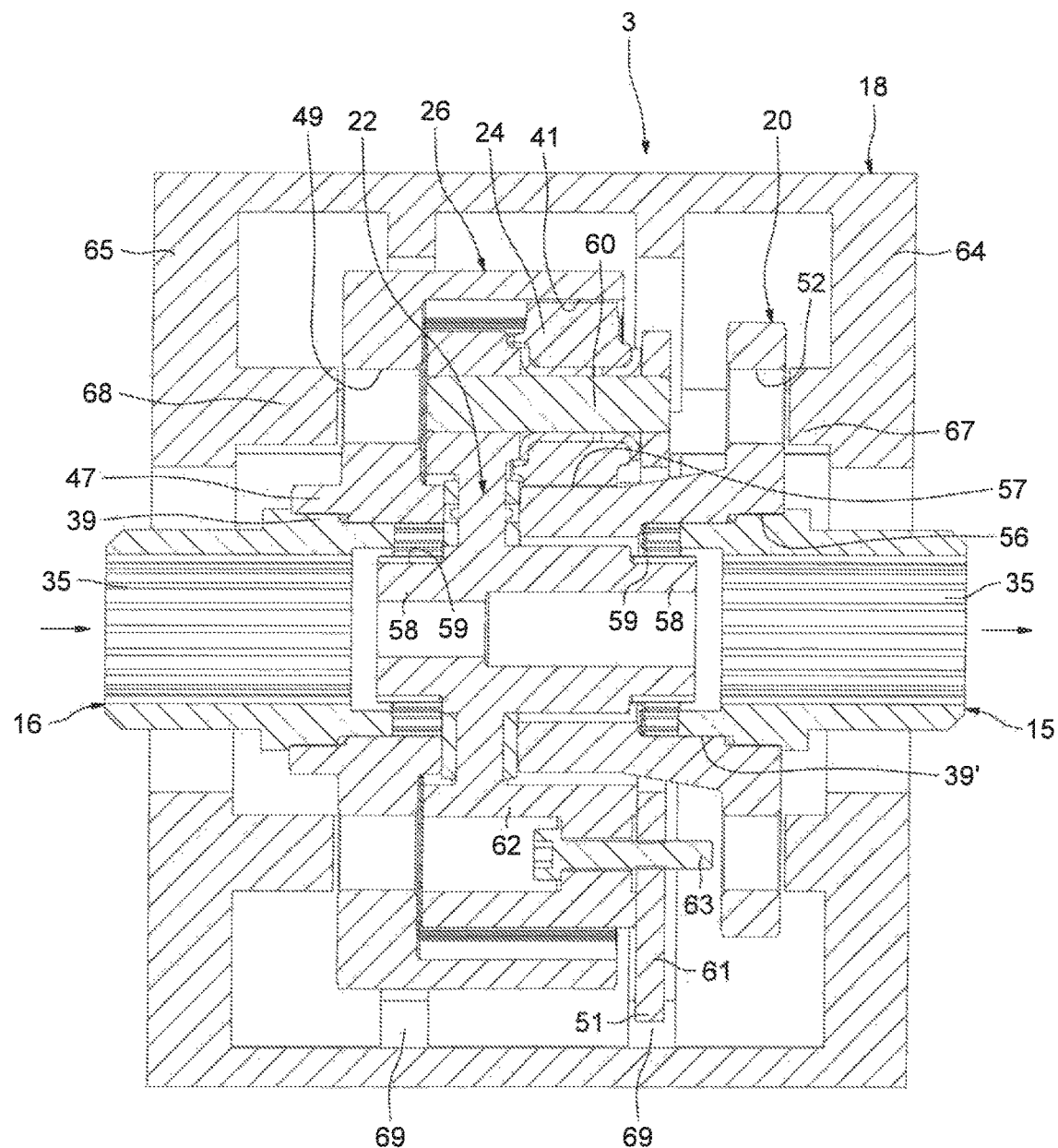

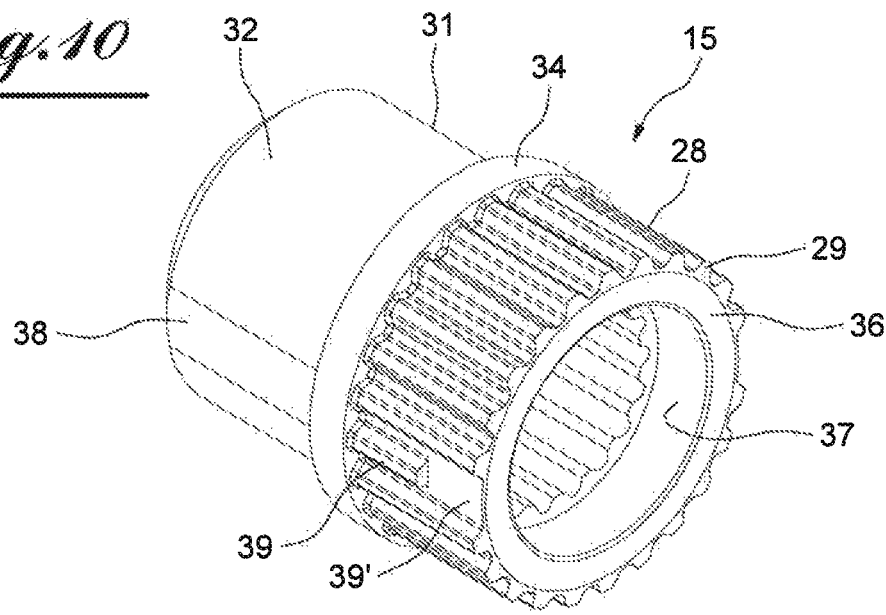
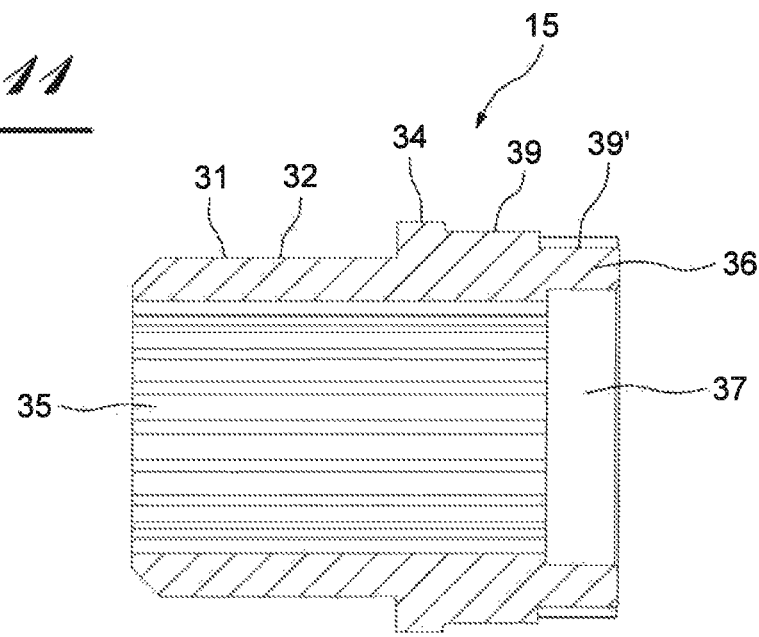

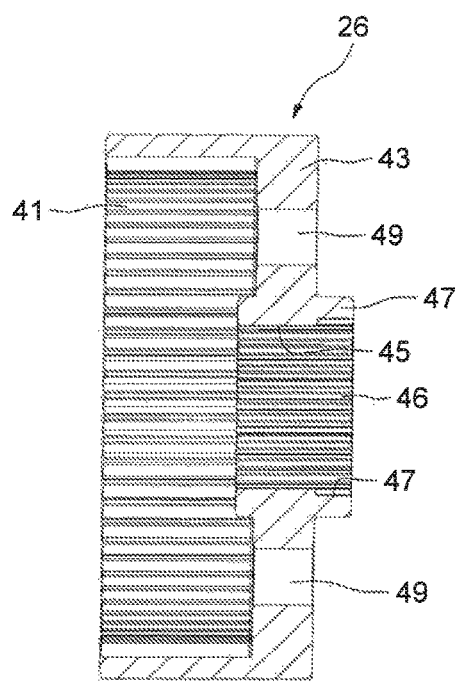
*Fig.12*
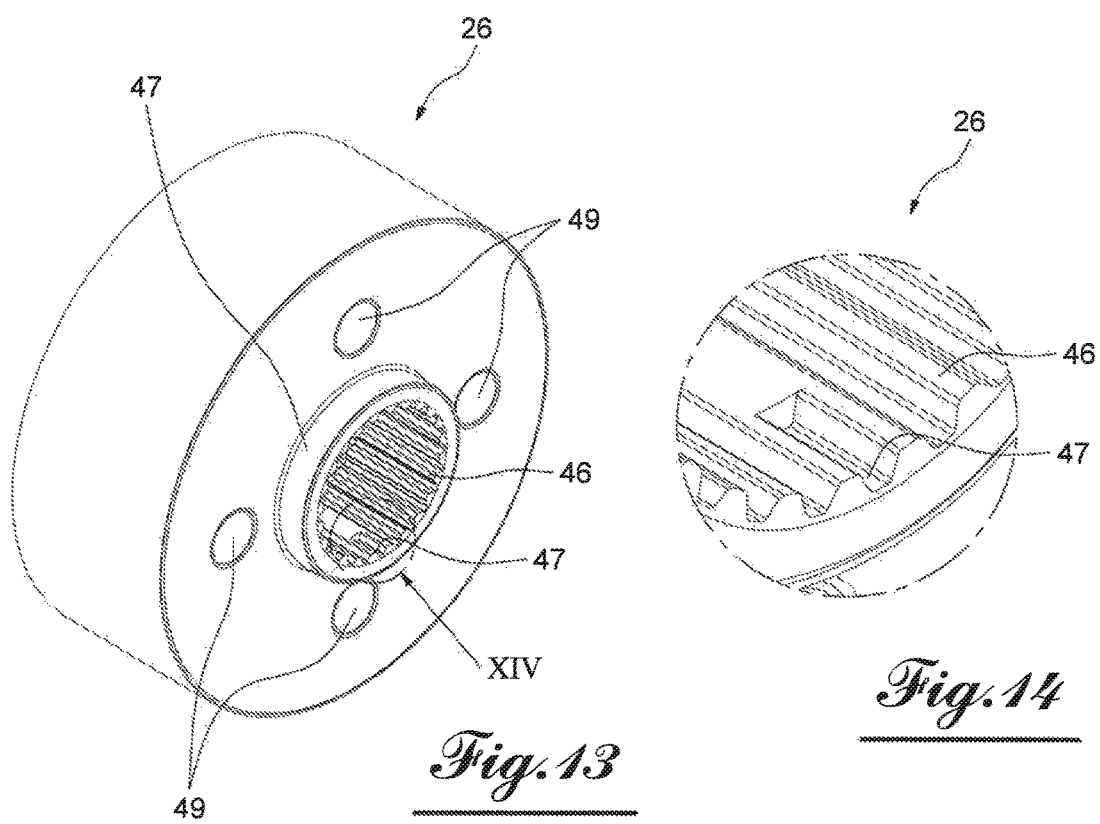
*Fig.13*
*Fig.14*

PLANETARY GEAR SET ADVANTAGEOUSLY FOR A SERVOMOTOR SYSTEM AND SERVOMOTOR SYSTEM USING THIS PLANETARY GEAR SET

FIELD OF THE INVENTION

The invention relates to a planetary gear set advantageously for a servomotor system, of the type comprising a plurality of rotary components mounted in at least one assembly configuration in a case and intended to produce a speed ratio between the input member and the output member, which is specific to this assembly configuration, and a multi-turn servomotor system for driving an actuator, such as a valve movable between an open position and a closed position of a conduit, and comprising a motor and a mechanical arrangement for transmitting power to the actuator.

BACKGROUND

In systems of this type, it is known to change the speed by changing the reductions of a wheel/screw device. This approach has the drawback of being difficult to carry out.

SUMMARY OF THE INVENTION

The invention aims to offset this drawback.

To achieve this aim, the planetary gear set according to the invention is characterized in that the components are designed to allow changes of assembly configuration, each of which produces a specific predetermined speed ratio.

According to one advantageous feature of the invention, the planetary gear set is characterized in that it comprises, enclosed in a case between the input and output members, an assembly including a sun gear, a planet carrier for planetary gears and a crown, and in that an assembly configuration is changeable by blocking in the case of at least one of the components of the aforementioned assembly.

According to another feature of the invention, the planetary gear set is characterized in that each of the three components of the aforementioned assembly may be blocked in the case by connecting thereto.

According to still another feature, the planetary gear set is characterized in that the assembly configurations are changeable by reversing the assembly direction of the aforementioned assembly in the case.

According to still another feature, the planetary gear set is characterized in that the sun gear and the crown are designed each to be assembled on the input member and the output member.

According to still another feature, the planetary gear set is characterized in that the aforementioned assembly is axially movable in the case in axial blocking positions either of the sun gear, or of the planet carrier, or of the crown.

According to still another feature, the planetary gear set is characterized in that the sun gear and the crown are able to be blocked in the case by a connection to a wall of the case.

According to still another feature, the planetary gear set is characterized in that the planet carrier is able to be blocked in the case by a connection to the cylindrical wall of the case.

According to still another feature, the planetary gear set is characterized in that the input and output members are identical and include, axially offset from the means for securing the sun gear and the crown in rotation, which are also provided with different rotational securing means, axially offset, to allow rotational securing in different axial positions on the input and output members.

According to still another feature, the planetary gear set is characterized in that the input and output members (66) are different.

The multi-turn servomotor system for driving an actuator, such as a valve movable between an open position and a closed position of a conduit, of the type comprising a motor and a mechanical arrangement for transmitting power to an actuator, which includes means for changing the speed ratio between the input and the output toward the actuator, and characterized in that the means for changing the speed ratio are formed by a planetary gear set according to the invention.

According to one advantageous feature of the invention, the servomotor system is characterized in that the aforementioned mechanical arrangement comprises the planetary gear set made in the form of an easily accessible separate unit and in that the remainder of the arrangement includes a reducing device of the screw and wheel type that is positioned in a lubricated compartment.

BRIEF DESCRIPTION OF DRAWING FIGURES

The invention will be better understood, and other aims, features, details and advantages thereof will appear more clearly, during the following explanatory description done in reference to the appended drawings, provided solely as an example illustrating two embodiments of the invention and in which.

Figure 3:
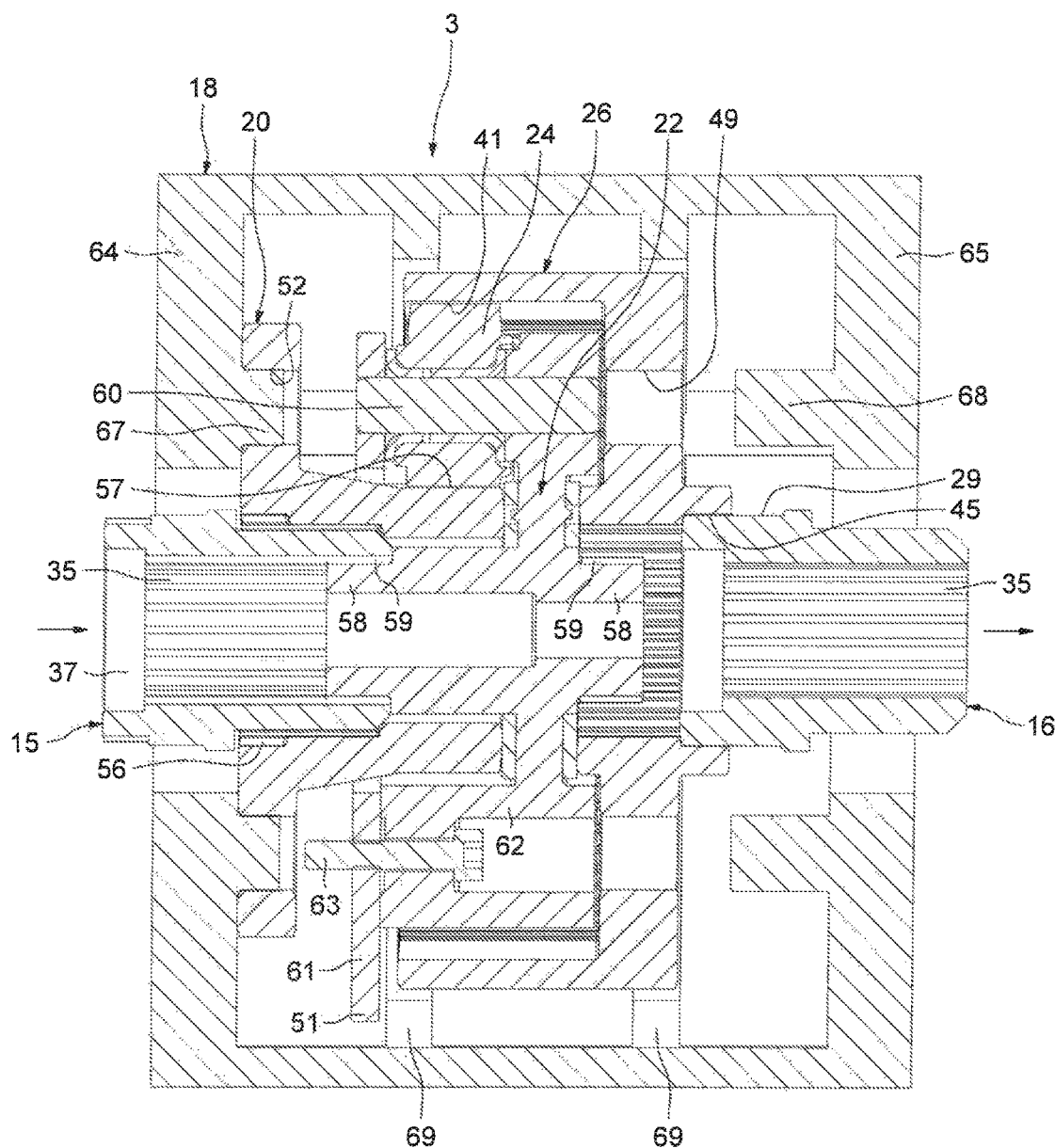
FIG. 3 is an axial sectional view of a first embodiment of the planetary gear set according to the invention, showing the latter in a first assembly configuration of its component parts.
Figure 4:
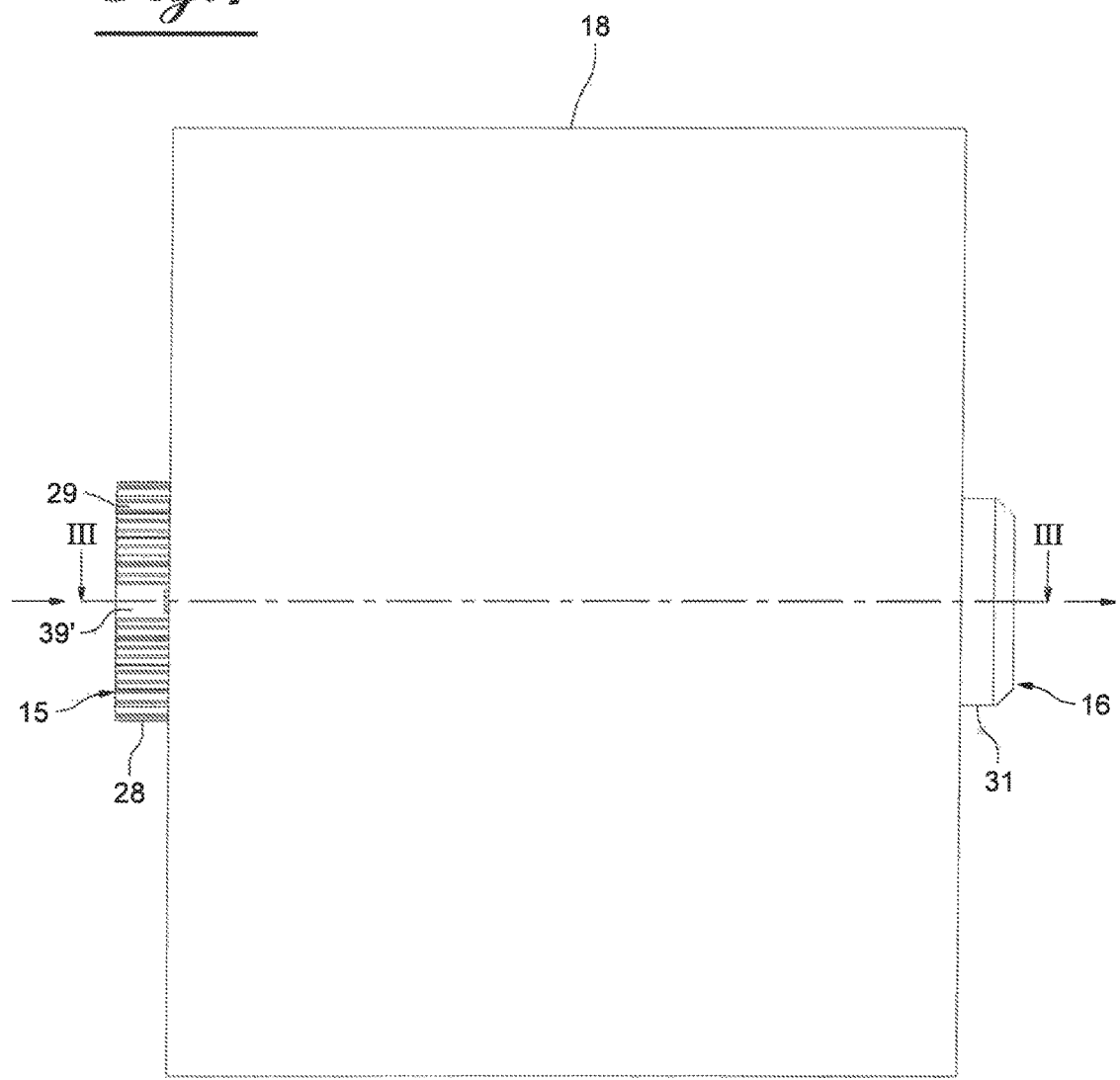
FIG. 4 is a top view of the planetary gear set of FIG. 3.
Figure 15:
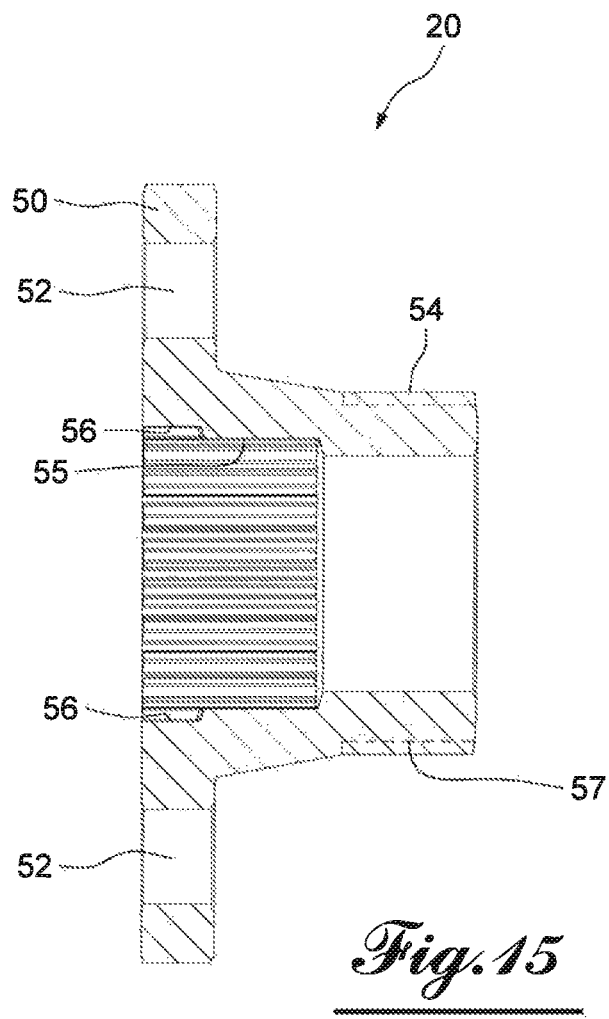
Figure 22:
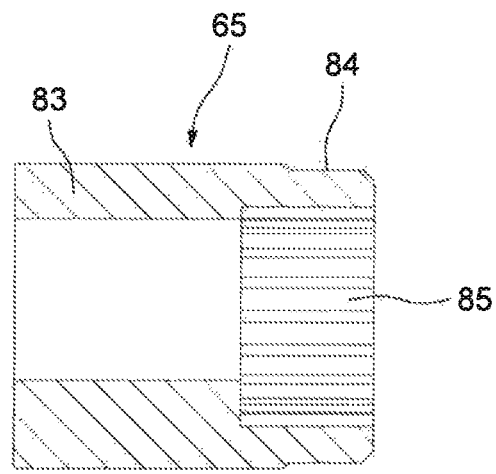
Figure 23:
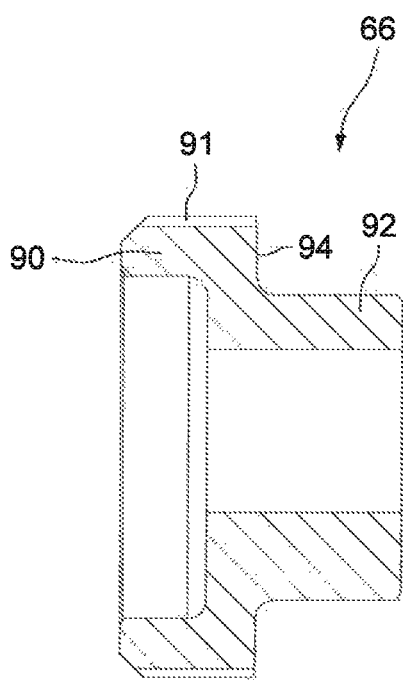
Figure 24:
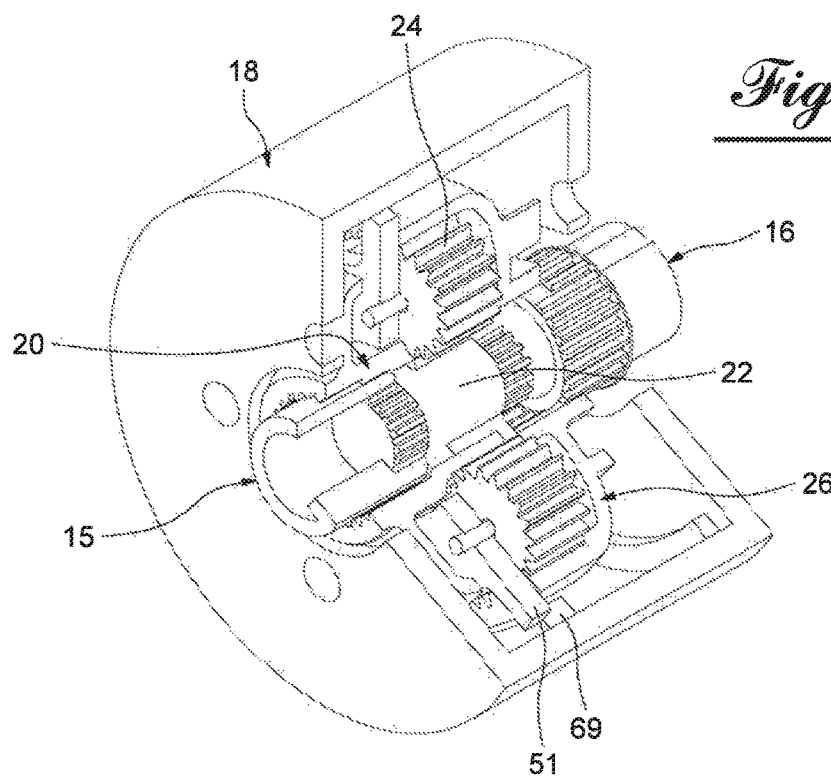
Figure 25:
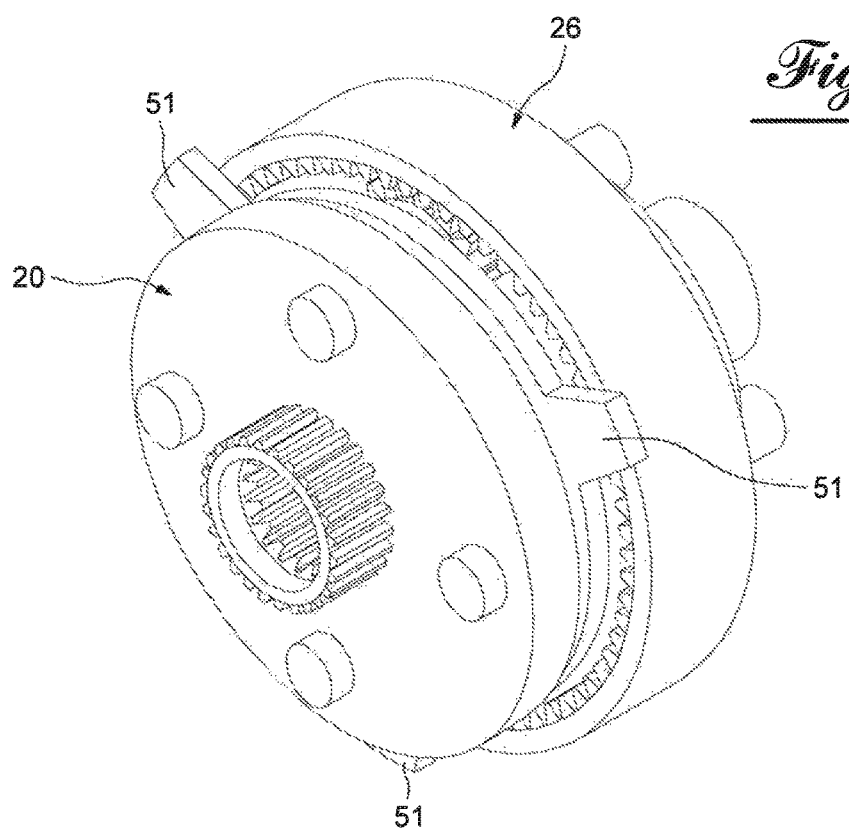

FIGS. 5, 6, 7, 8, and 9 are axial views of the planetary gear set according to the invention, showing the latter in five other assembly configurations of the component parts, different from those of FIG. 3;

FIG. 10 is a perspective view of the sleeve of the planetary gear set of FIGS. 3 to 9, indicated by reference 15 in FIGS. 3 to 9;

FIG. 11 is an axial sectional view of the sleeve of FIG. 10;

FIG. 12 is an axial sectional view of the crown of the planetary gear set of FIGS. 3 to 9, identified by reference number 26;

FIG. 13 is a perspective view of the crown of FIG. 12;

FIG. 14 is an enlarged view of the detail surrounded by circle XIV in FIG. 13;

FIG. 15 is an axial sectional view of the sun gear of the planetary gear set according to the invention, designated by reference number 20 in FIGS. 3 to 9;

FIGS. 16 to 21 are axial sectional views of six different assembly configurations of a second embodiment of the planetary gear set according to the invention;

FIGS. 22 and 23 are two axial sectional views of the two sleeves of the second embodiment of the planetary gear set according to the invention;

FIG. 24 is a perspective view of a planetary gear set according to the invention, with the case in partial cutaway;

FIG. 25 is a perspective view of the components of a planetary gear set according to the invention, without the frame.

DETAILED DESCRIPTION

Figure 1:
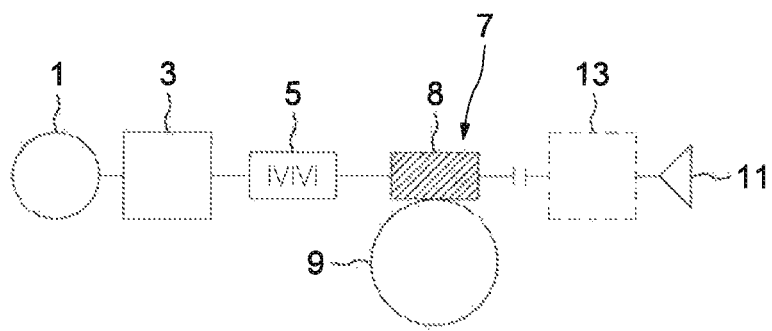
FIG. 1 is a functional block diagram of a servomotor system according to the invention.
Figure 2:
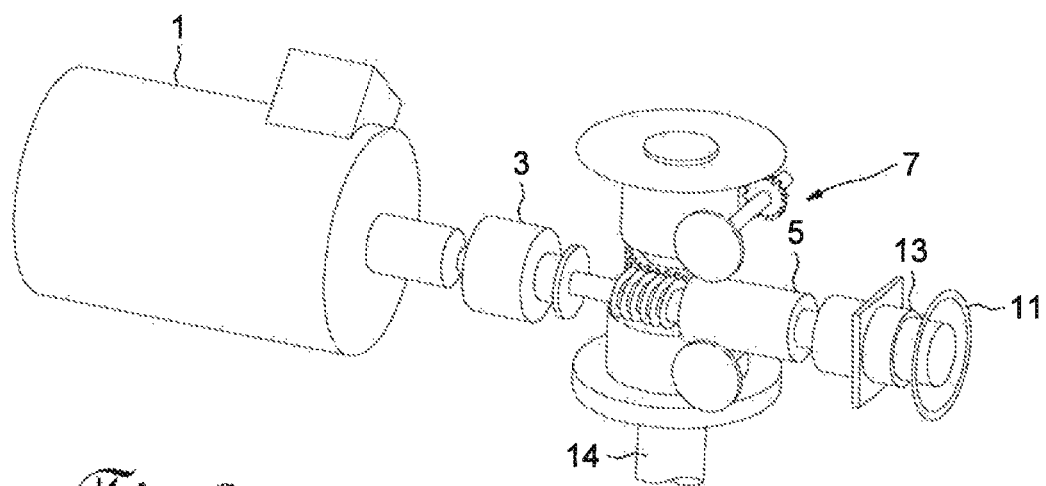
FIG. 2 is a perspective view of the system of FIG. 1.

FIGS. 1 and 2 show, in the form of a functional block diagram, a multi-turn servomotor system according to the invention, which comprises, mounted in series, a motor 1, a planetary gear set 3, a force limiter 5 and a reducing device 7 including a screw 8 and a wheel 9 that meshes with the screw 8, is secured in rotation to the output shaft 14 of the system and intended to drive a working device or member, for example a valve closing and opening a conduit (not shown). The figure further shows, also mounted in series with the screw 8, a flywheel 11 for manually actuating the actuator and a clutch system 13. In FIG. 2, the force limiter is placed between the reducing device 7 and the clutch system 13.

As shown for example in FIG. 3, the planetary gear set 3 according to the invention essentially includes an input sleeve 15 and an output sleeve 16, which constitute the input and output members, respectively, and are mounted in a case 18 that contains a sun gear 20, a planet carrier 22 carrying planet gears 24 and a crown 26. In the first embodiment according to FIGS. 3 to 9, the input 15 and output 16 sleeves are identical. The arrows indicate the transmission direction of the torque produced by the motor, the input sleeve 15 being situated on the motor side.

We will first describe the various components of the system.

FIGS. 10 and 11 illustrate the input sleeve 15 identical to the output sleeve 16. The sleeve 15 is made in the form of a tubular body that comprises, successively in the axial direction, from one end to the other, a part 28 provided on its outer face with axial splines 29 and a part 31 whereof the outer surface 32 is smooth and which is separated from the part 8 by a collar 34. The diameter of the peripheral surface 32 is smaller than the diameter of the peripheral surface of the part 28. The inner surface of the sleeve 15 is axially cannulated in 35, except over the end part 36 of the part 28, the inner face 37 of which is smooth. Two of the splines 29, diametrically opposite and denoted 39, are truncated, and these splines are omitted in 39' in the peripheral portion above the smooth end inner surface part 37.

The references 38 indicate two diametrically opposite mounting guides situated in the extension of the truncated splines.

The crown as shown in FIGS. 12 to 14 is in the form of a hollow cylindrical body, the inner cylindrical surface of which is toothed in 41 and closed at one end by a radial wall 43 that has, in its central part, a passage 45 that is axially extended by an end-piece 47. The inner surface of the passage in the end-piece is provided with splines 46, except in two radially opposite locations where the splines have been omitted and only produced in 47 in the inner surface of the end-piece. Furthermore, the radial wall 43 is pierced with four holes 49 that are distributed angularly equidistantly around the end-piece.

FIG. 15 shows the sun gear 20, which is made in the form of a tubular body provided at one end with a flange 50 that includes four holes 52 distributed equidistantly in the peripheral direction. The inner cylindrical surface of the sun gear is smooth over the half 54 that is opposite the flange 50 and cannulated over the other half 55. Two splines 56, situated diametrically opposite one another, are truncated. The peripheral outer surface of the inwardly smooth half 54 is provided with a toothing 57.

The end parts 58 of the planet carrier 22 are cannulated over their outer peripheral surface in 59 and the three planet gears 24 are each carried by an axle 60 supported by a radial plate 61 fastened on the support part 62 of the planet carrier by screws 63.

It should also be noted that the radial end walls 64, 65 of the case 18 bear, on their axially inner surface, cylindrical studs 67, 68, respectively, which are intended to cooperate with the holes 49 and 52 of the sun gear and the crown. These studs are therefore distributed equidistantly in the peripheral direction with respect to one another.

After the description of the various components of the planetary gear set, below we will describe the six different mounting configurations of this gear set, which make it possible to change the speed of the output shaft 14 of the servomotor system without having to change the screw 8 and wheel 9 reducing device 7.

In the assembly configuration according to FIG. 3, the sun gear 20 is blocked, since the studs 67 of the case engage in the holes 52 of the sun gear. The input sleeve 15 is secured in rotation with the planet carrier 22 because its splines 35 and the splines 59 of the adjacent end 58 of the planet carrier are mutually engaged. The planet gears 24 carried by the planet carrier 22 mesh with the teeth 57 of the sun gear and are engaged with the teeth 41 of the crown, which in turn is secured to the output sleeve 16 by mutual engagement of the splines 29 of the sleeve and splines 45 of the crown. Thus, the rotational driving of the input sleeve 15 causes the rotation of the output sleeve 16. It should be noted that these two sleeves are identical, but only mounted in the planetary gear set in opposite directions.

The perspective views of FIGS. 24 and 25 make it easier to understand the above description. These figures show that the planet carrier 22 comprises, on its periphery, blocking tabs 51 that are intended to cooperate with the stop elements 69 on the inner cylindrical face of the case 18 in the manner that will be described later. The blocking studs of the sun gear and the crown are provided, in these figures, on these components and not on the case like in FIG. 3.

In the mounting configuration of FIG. 3, for example for a motor speed of 1400 RPM and a screw/wheel reduction of the device 7, the speed at the output of the system, i.e., the output axle, 14 is 146 RPM.

Figure 5:
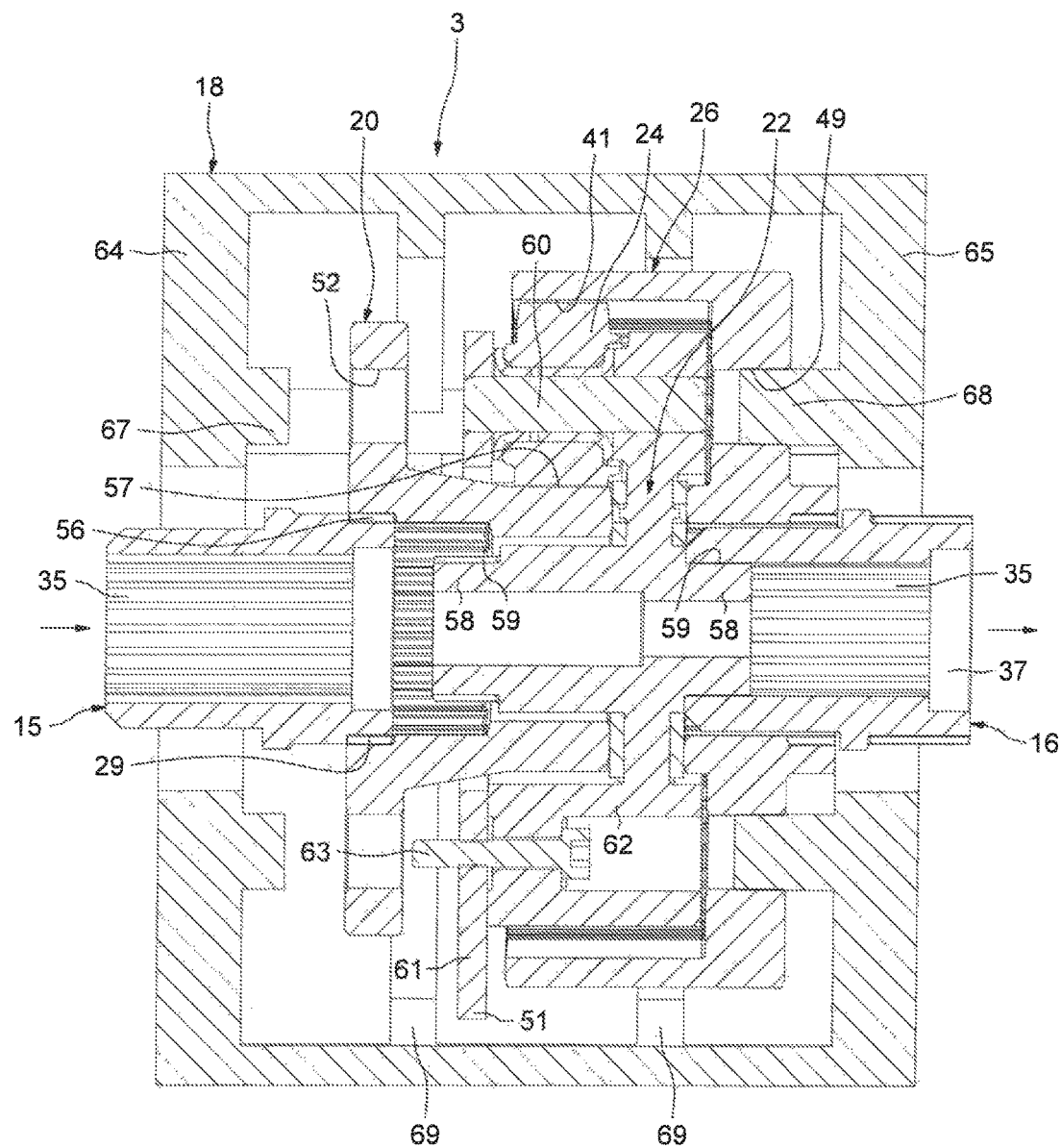

In the configuration of FIG. 5, the crown 26 is blocked, since the studs 68 of the case engage in the holes 45 of the crown. The assembly formed by the crown, the planet carrier and the sun gear is axially offset to the right, relative to the mounting configuration of FIG. 3, and the sun gear is therefore freed from the studs 67 of the case. Relative to FIG. 3, the input sleeve 15 is oriented in the reverse manner, and it is now the part provided with the splines 29 that is inside the case and is engaged by these splines in the truncated splines 56 of the sun gear thus secured in rotation with the input sleeve 15. The teeth 57 of the sun gear meshing with the teeth of the planet gears 24, the planet carrier 22 is rotated when the sleeve 15 and the sun gear 20 rotate. Given that the splines 59 of the end 58 situated on the output side are engaged with the inner splines 35 of the output sleeve 16, the latter is therefore rotated by the planet carrier. One can see that its position in the case 18 is reversed relative to FIG. 3.

In the case of the mounting configuration of the components of FIG. 5, compared to the mounting configuration of FIG. 3, for the same rotation speed of the motor and the same reduction of the device 7 with screws and wheels, the output speed of the system, i.e., the output axle 14 of the system, is 30 RPM relative to the value of 146 RPM of FIG. 3.

Figure 6:
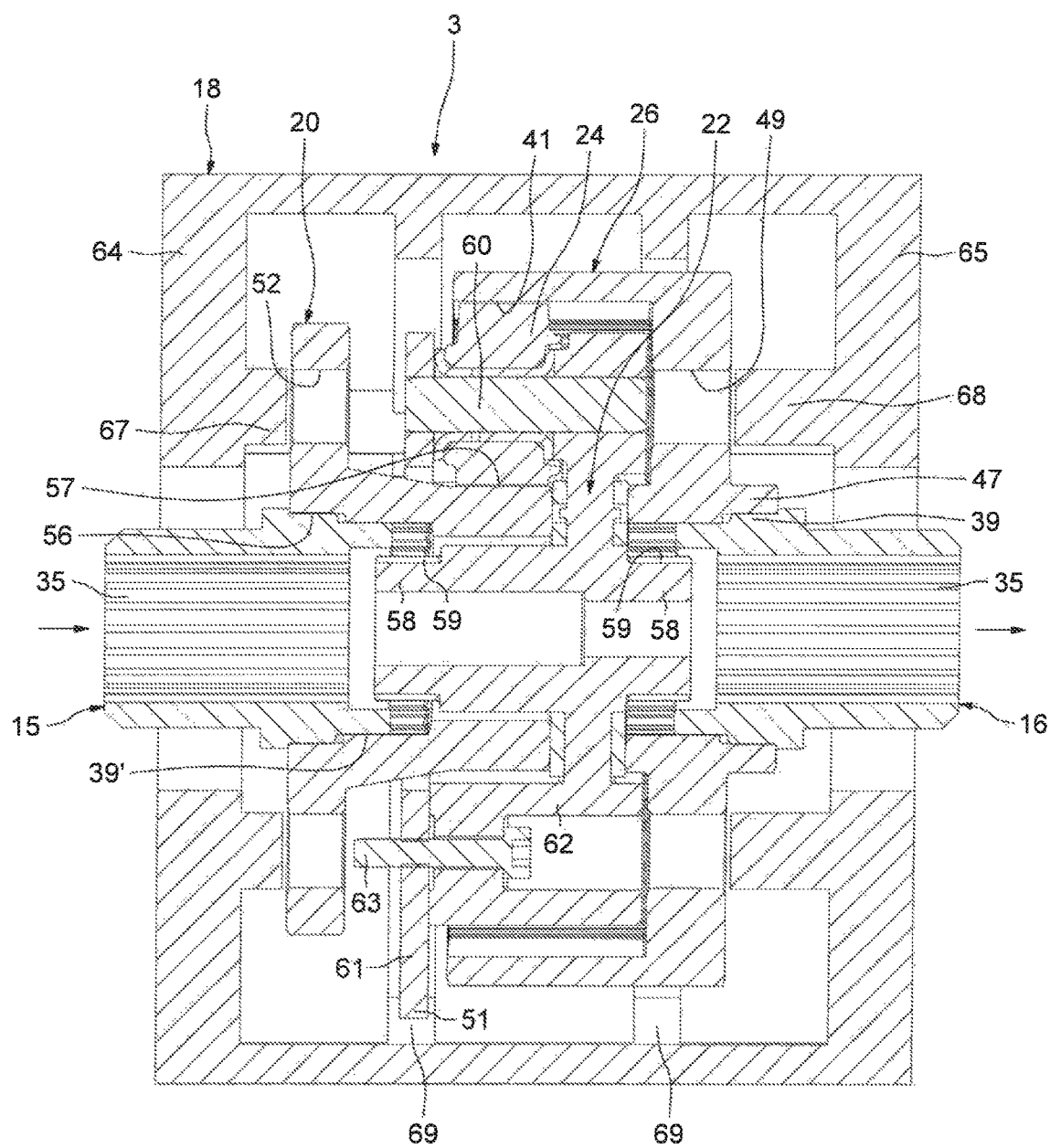

FIG. 6 shows a third mounting configuration, the particularity of which lies in the fact that it is the planet carrier that is blocked. The assembly formed by the planet carrier and the crown is situated between the blocking studs 67 and 68 of the case. In this position of the assembly, the blocking tabs 51 of the planet carrier abut against the stop elements 69 of the case, which immobilizes the planet carrier. The input sleeve is oriented like in the case of FIG. 5, but the sun gear 20 is secured in rotation with this sleeve by the mutual engagement of its inner splines 55 with the outer splines 29 and the truncated splines 39 of the sleeve, the truncated splines 56 seeing to the correct axial position of the sun gear on the sleeve. Thus, the rotation of the sleeve 15 causes the rotation of the sun gear 20. The planet carrier being blocked, the sun gear rotates the planet gears 24 by the engagement of its teeth 57 in the teeth of the planet gears, which, in turn, cause the rotation of the crown 26, which causes the output shaft 16 to rotate by the engagement of the splines 29 of the sleeve 16 in the splines 45 of the crown.

The assembly configuration of the planetary gear set according to FIG. 6 makes it possible to obtain a rotation speed of the output shaft 14 toward the actuator of 43 RPM, for the same speed of the motor, i.e., at the input of the gear set, and with the same reduction of the device 7 with screws and wheels as in the case of the configurations of FIGS. 3 and 5.

Figure 7:
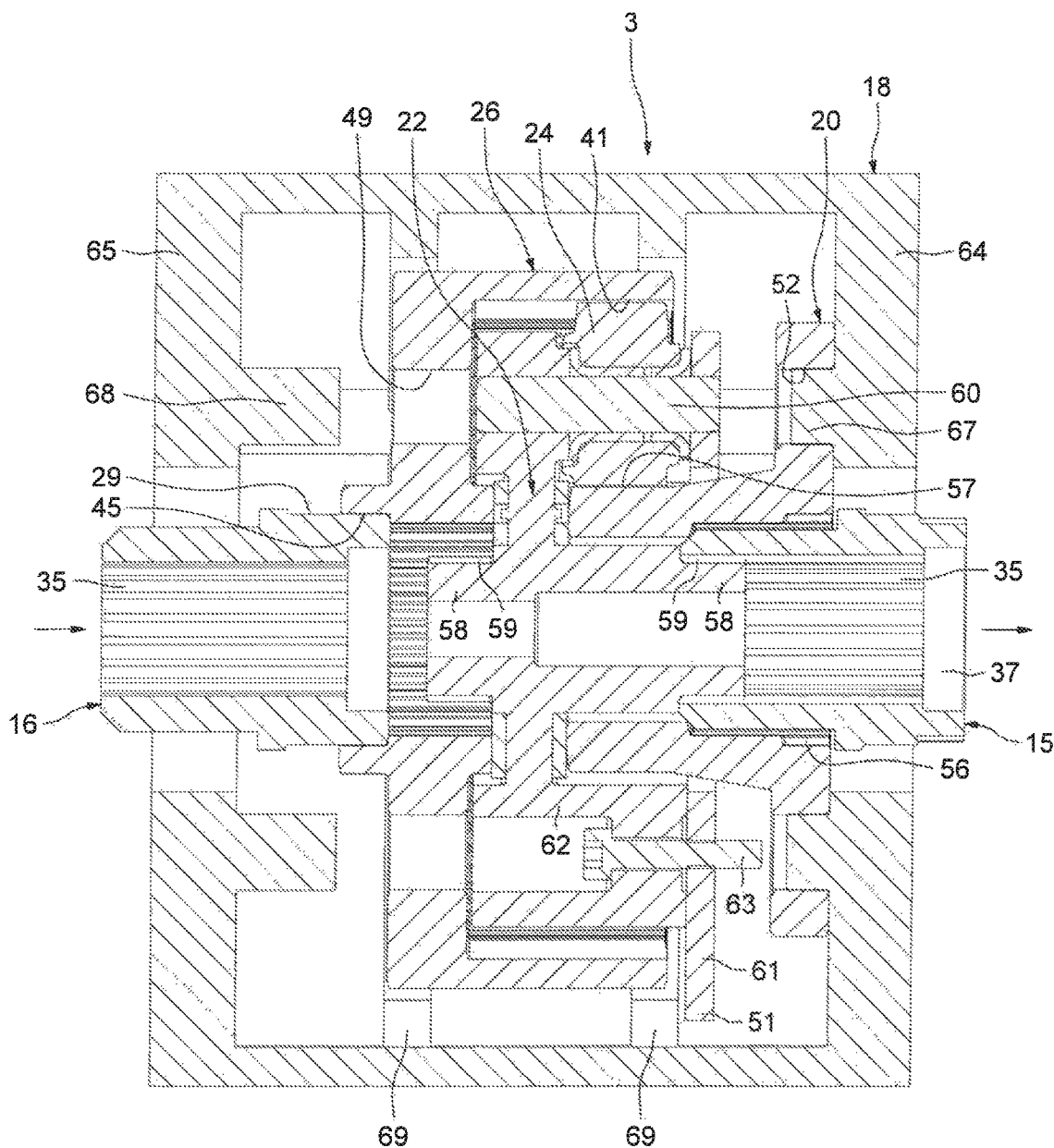

The configurations of FIGS. 7 to 9 respectively correspond to the configurations of FIGS. 3, 5 and 6, but the torque is transmitted in the opposite direction, i.e., the output sleeves 16 of FIGS. 3, 5 and 6 now constitute the input sleeves. In other words, it is the sleeves 16 that are rotated by the motor and the sleeves 15 of FIGS. 3, 5 and 6 that constitute the outputs of the planetary gear set. At the same motor speed and the same reduction as in the case of the configurations of FIGS. 3, 5 and 6, the actuator output speeds of the output shaft 14 are obtained of 37 RPM for FIG. 7, 178 RPM for FIG. 8 and 126 RPM for FIG. 9, respectively.

FIGS. 16 to 23 show a second embodiment of the planetary gear set according to the invention. This embodiment has the particularity, relative to the first embodiment, that the sleeves, now bearing references 65 and 66, the sun gear and the crown, now respectively 70 and 76, no longer have truncated splines. The planet carrier with the planet gears, now designated by references 72 and 74, respectively, is substantially the same as in the first embodiment. Another difference lies in the fact that the case, now denoted 68, no longer has protruding blocking studs, but that the blocking either of the sun gear 70, or of the crown 76, is obtained by inserting blocking pins 78 through holes 80 formed in the front walls of the housing 68 in the locations of the studs 67 and 68 of the first embodiment.

In this embodiment, as shown in FIG. 22, the sleeves, denoted 65, is made in the form of a tubular body 83, an end part of which, denoted 84, is provided with axial inner splines 85. The sleeve 66 is a tubular body with a stepped form, which comprises a cylindrical part 90 having a larger diameter and a part 92 with a smaller diameter, as well as a radial intermediate part 94 connecting the parts 90 and 92. The outer and inner peripheral cylindrical surfaces of the part 90 are cannulated. The splines are respectively designated by references 91 and 93.

It should also be noted that, relative to the sun gear 20 of the first embodiment, the sun gear 70 comprises a cylindrical annular end-piece 96, the inner face of which is axially cannulated, the splines being designated by reference 97. The end-piece 96 axially protrudes from the side opposite the tubular part 99, the outer surface of which is provided with teeth 100 so as to be able to mesh with teeth of the planet gears 74. The tubular end-piece 96 has a diameter larger than the diameter of the part 99, such that its splines 97 can cooperate with the splines 91 of the sleeve 66.

The crown 76 of this second embodiment includes, on the side opposite that housing the planet gears 74, a cylindrical axial end-piece 102, the inner surface of which is cannulated. The splines 104 are oriented in the direction of the axis of the crown. The inner diameter of the cannulated part corresponds to the outer diameter of the sleeve 66 so that the splines 104 and 91 of the end-piece and the sleeve can engage in one another.

FIGS. 16 to 21 illustrate six different mounting configurations of the components of the planetary gear set, i.e., of the sleeves, sun gear, planet carrier with its planet gears and the crown, which correspond to the six configurations of FIGS. 3, 5 to 9 of the first embodiment of the planetary gear set.

Figure 16:
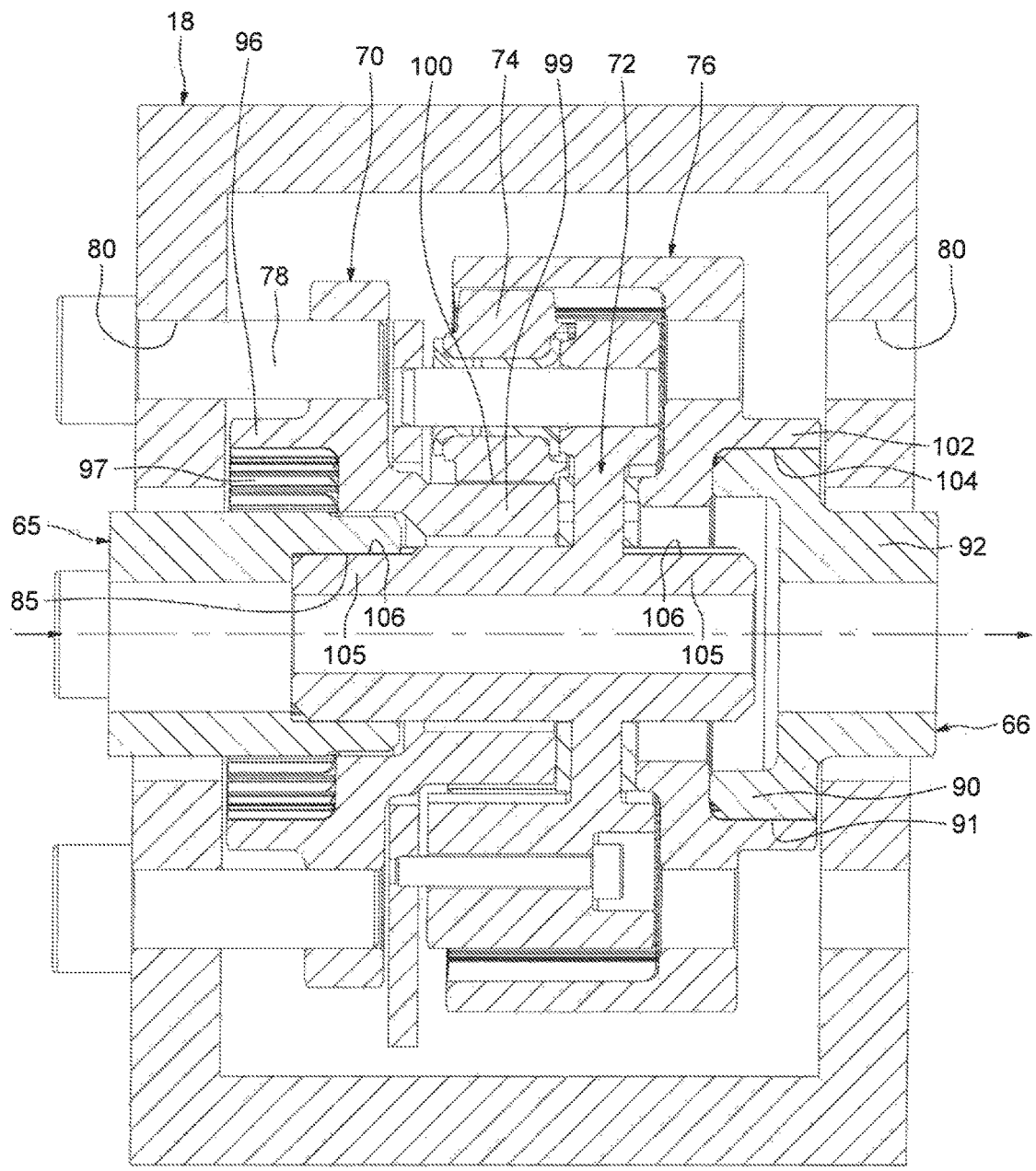

In FIG. 16, a sleeve 65 is used as input sleeve. The sun gear 70 is blocked on the case by a pin 78. Consequently, the planet carrier 70 is rotated by mutual engagement of the splines 85 of the sleeve 65 and the splines 106 of the adjacent end part, now bearing reference 105, of the planet carrier, which, in turn, rotates, via its planet gears 74, the crown 76, which is secured in rotation with the output sleeve 66 by mutual engagement of the splines 91 and the splines 104 on the inner surface of the axial cylindrical tubular end-piece 102 of the crown.

Figure 17:
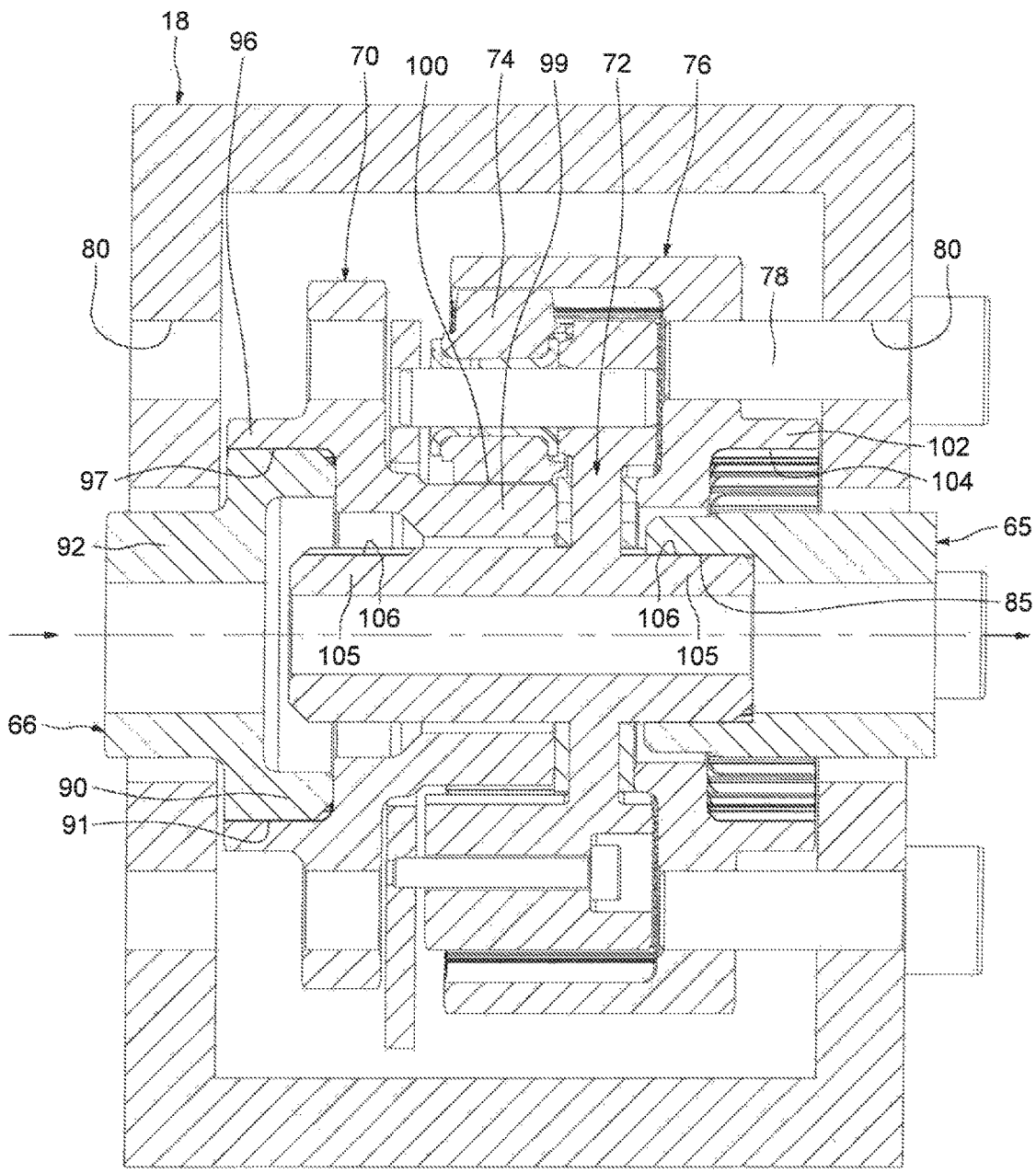

In the assembly configuration of FIG. 17, it is the crown 76 that is blocked on the case by a pin 78, and the sleeve 66 that makes up the input sleeve. The rotational movement of the input sleeve 66 is transmitted to the sun gear 70 by engagement of the splines 97 of the sun gear and the splines 91 of the sleeve, then by the teeth 100 of the sun gear to the planet gears 74 and by the planet carrier 72 to the output sleeve 65, the splines 85 of which are engaged in the splines 106 of the adjacent end part 105 of the planet carrier.

Figure 18:
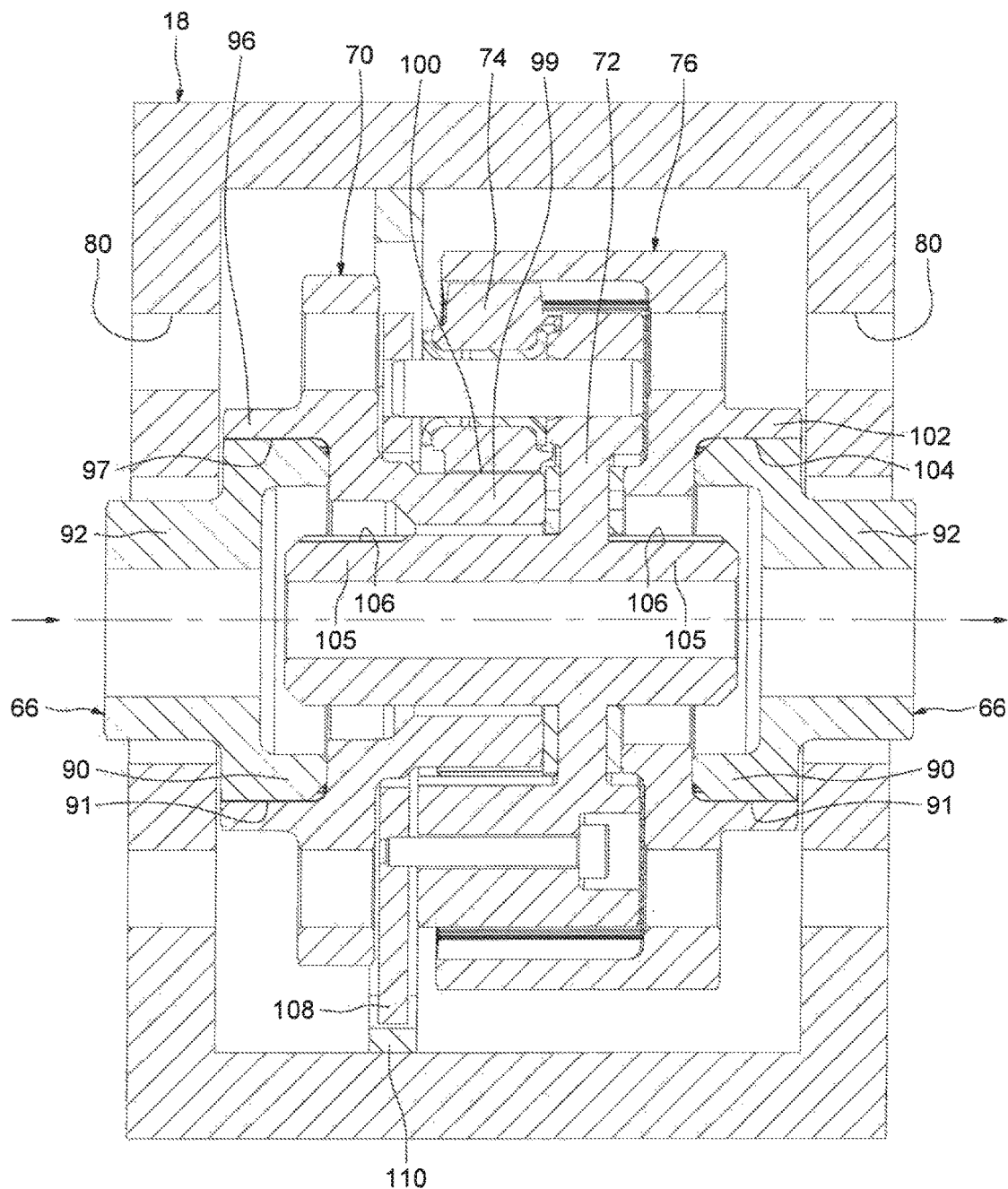

In the assembly configuration of FIG. 18, the planet carrier 72 is blocked owing to the blocking tabs 108 at the periphery thereof, which are abutting against the stop elements 110 on the inner cylindrical surface of the case. The sleeve 66 serves both as input sleeve and output sleeve. The rotational movement of the input sleeve 66 is transmitted to the sun gear 70, like in the assembly configuration of FIG. 17, then from the sun gear to the planet gears 74, from the latter to the crown 76, and from the crown to the output sleeve 66 by mutual engagement of the splines 104 of the annular end-piece 102 and the splines 91 of the sleeve.

Figure 19:
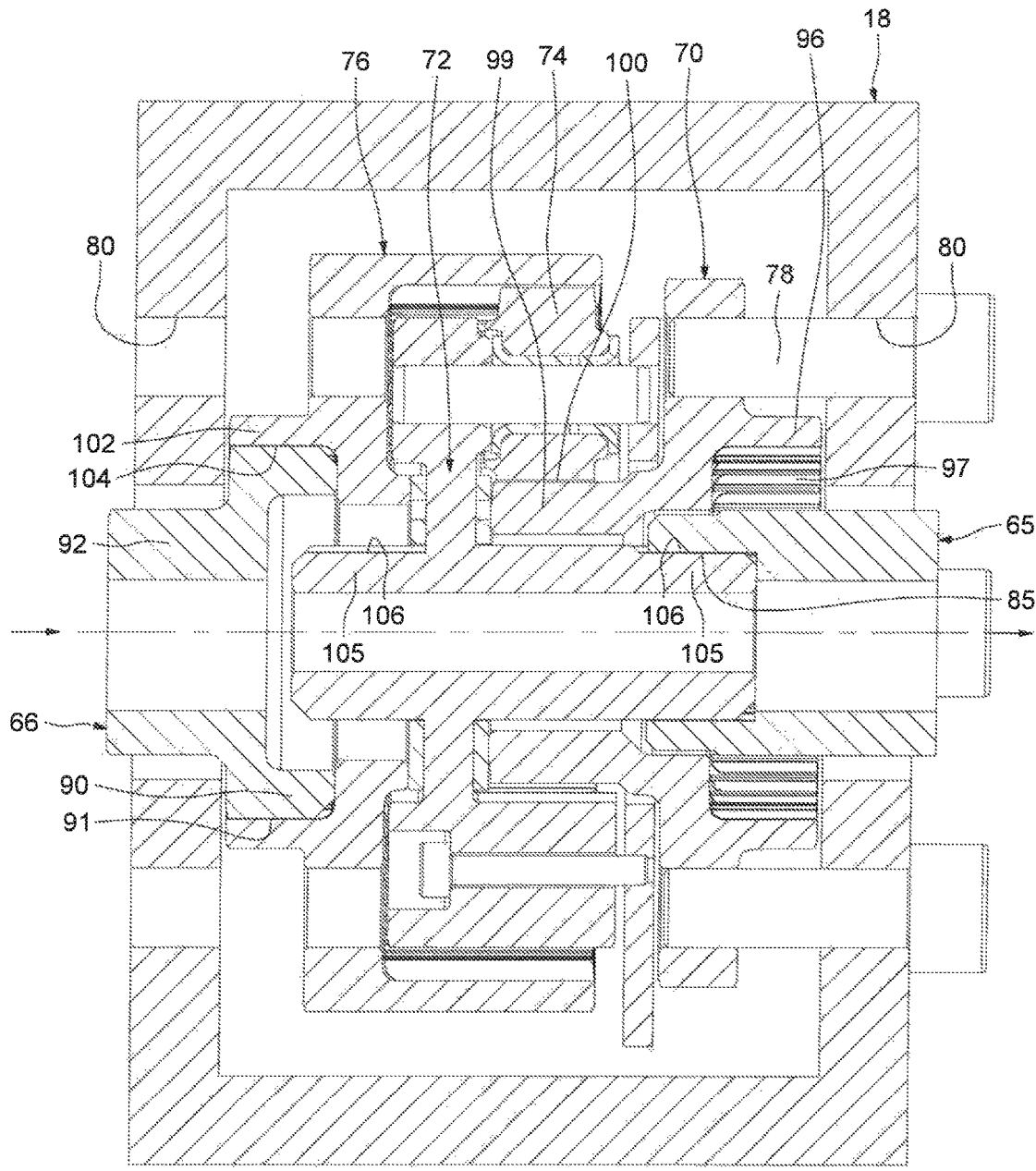
Figure 20:
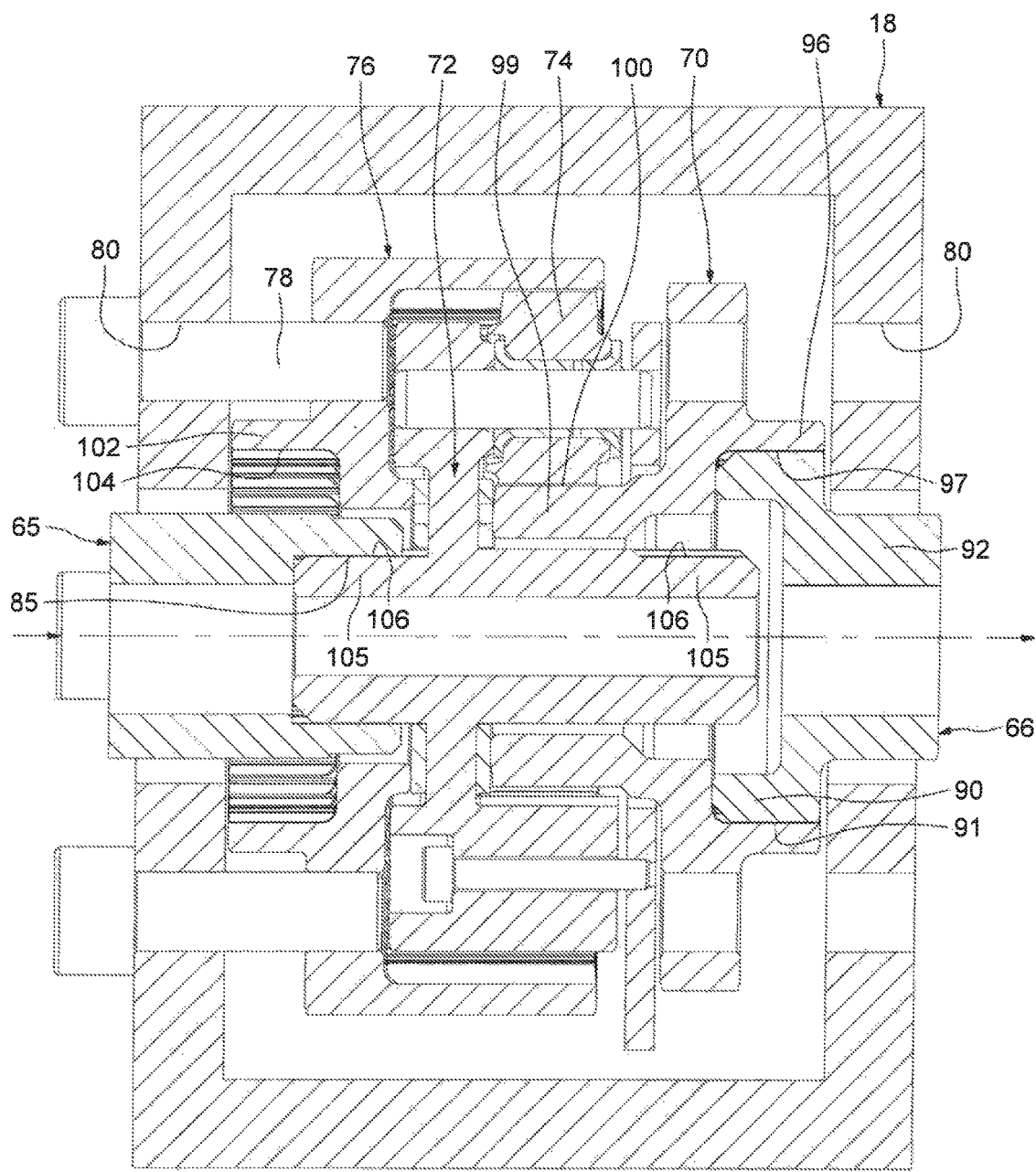
Figure 21:
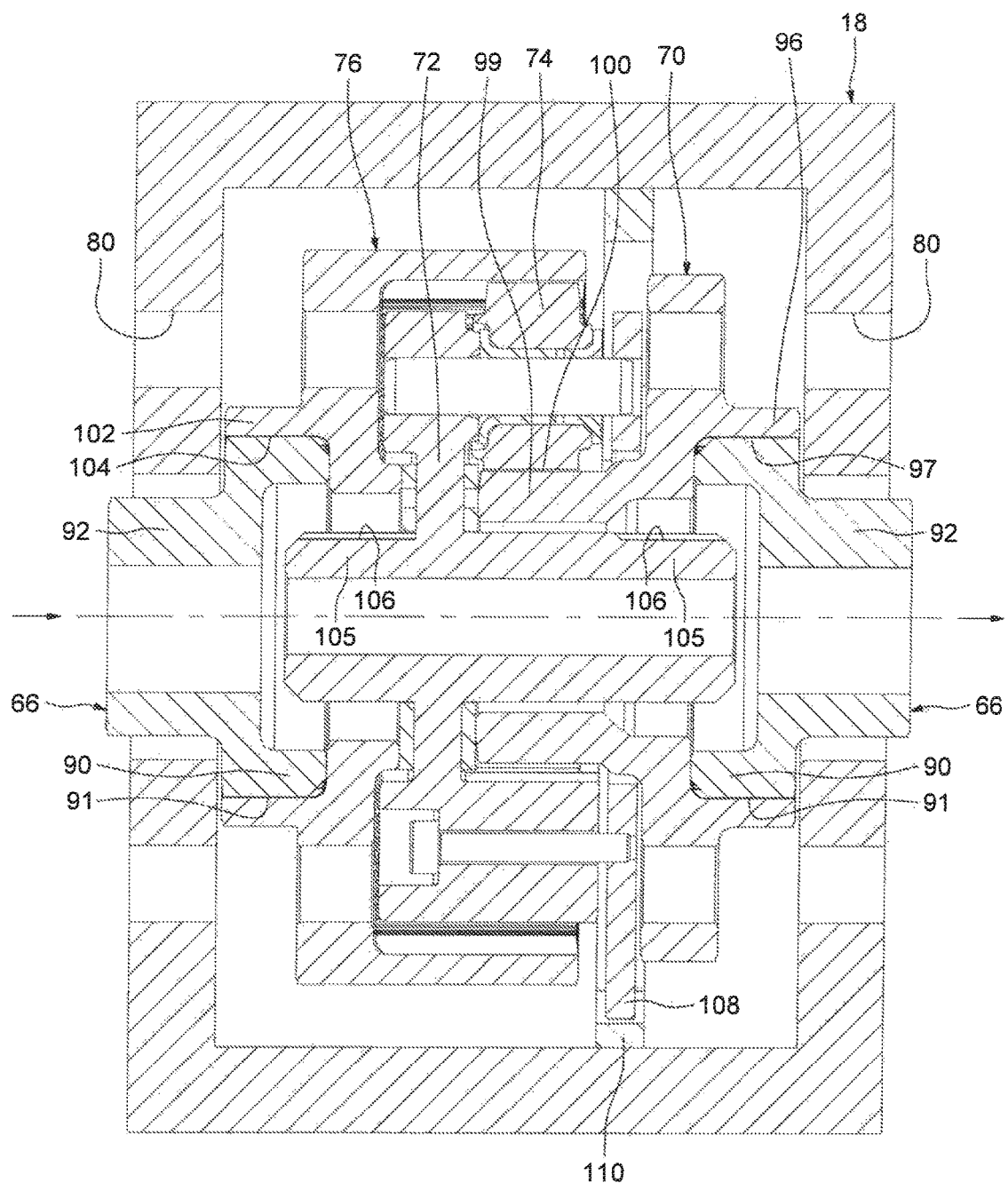

In the case of the assembly configurations of FIGS. 19 to 21, the transmission of the rotational movement from the input to the output of the planetary gear set is done opposite the transmission direction of FIGS. 16 to 18, the output sleeve serving as input sleeve and the input sleeve of FIGS. 16 to 18 serving as output sleeve.

Given that the components of the second embodiment correspond to the first embodiment, the output speeds of the system correspond to those provided above for the first embodiment.

The description of the two embodiments of the planetary gears according to the invention, which has been provided solely as an example and is therefore not limiting, shows that the invention makes it possible, through simple changes in the configuration of the assembly of the planetary gear set, to change the reduction and the speed of the servomotor system. The various assembly configurations are obtained by changing the element to be blocked, i.e., the crown, the sun gear or the planet carrier, on the one hand, and by reversing the assembly direction of the gear set, i.e., by reversing the input and the output, on the other hand. Thus, six different configurations make it possible to produce six different speeds of the output shaft, on the actuator side, of the system, for the same speed of the motor and the same reduction at the screw and wheel device. Thus, in the case of the invention, instead of producing the different speeds of the system by changing wheel/screw reductions, solution which is recommended in the state of the art, the invention makes it possible to achieve this aim through simple changes in the configuration of the assembly of the components of the planetary gear set. To make the change of speeds still easier, the planetary gear set is made in the form of a separate assembly that is easily accessible between the motor and the rest of the mechanical arrangement, as shown in FIGS. 1 and 2, which can be housed in a lubricated compartment. Thus, the invention offers the advantageous possibility of changing the speed of the system without having to change the screw and wheel device, and thus the wheel/screw torque, simply by changing the configuration of the planetary gear set, which is easy to access, since it is made in the form of an independent subassembly mounted in a case in a simple form, advantageously cylindrical, in which the component parts of the gear set are housed. Furthermore, due to their simple form and their mounting inside the housing, the changes of the configurations of the mounting operations are easy to implement.

Of course, the above description of two embodiments of the invention and their depictions in the figures has been provided purely as an example and is not limiting. Thus, the components can be made differently without changing the scope of the invention. For example, the gear set could be made in a polymer version and a sintered metal version. It is also possible to consider providing the blocking studs on the sun gear and the crown and the receiving holes for the studs in the side walls of the case. The latter is also only made in the illustrated form as an example. One of the two front walls and the cylindrical wall could be made in the case of the servomotor, the other front wall then being made with the flanged front flange of the electric motor. Furthermore, the blocking of the sun gear and the crown as well as the planet carrier could be done differently. Thus, it is possible to consider blocking the sun gear and the crown by a radial connection to the case.

The invention claimed is:

1. A planetary gear set comprising
   a plurality of rotary components mounted in at least one assembly configuration in a case and producing a speed ratio of the planetary gear set, between an input member and an output member,
   wherein the rotary components allow changes in assembly configuration, and each assembly configuration produces a specific predetermined speed ratio,
   the planetary gear set further comprising, between the input and output members, an assembly of rotary components including a sun gear, a planet carrier for planetary gears, and a crown,
   wherein an assembly configuration is changeable by blocking, within the case, at least one of the rotary components of the assembly,
   wherein the assembly is axially movable within the case into three axial blocking positions, in which respectively the sun gear, the planet carrier, or the crown is blocked by the case, and
   wherein the sun gear and the crown may be blocked, within the case, by a connection to an end wall of the case, and the planet carrier may be blocked, within the case, by a connection to a cylindrical wall of the case.

2. The planetary gear set according to claim 1, wherein each of the rotary components of the assembly may be blocked, within the case, by connecting to the case.

3. The planetary gear set according to claim 1, wherein the assembly configurations are changeable by reversing assembly direction of the assembly, within the case.

4. The planetary gear set according to claim 1, wherein the sun gear and the crown may each be assembled on the input member or the output member.

5. The planetary gear set according to claim 1, wherein the input and output members are identical and include, axially offset from each others, several means for securing the sun gear and the crown in rotation, the sun gear and the crown further including several different rotation blocking means, axially offset from each others, for rotationally securing the sun gear and the crown in different axial positions on the input and output members.

6. The planetary gear set according to claim 1, wherein the input and output members are different.

7. A multi-turn servomotor system for driving a working member comprising a motor, and a mechanical arrangement for transmitting power to an actuator, and which includes means for changing speed ratio between an input and an output toward the actuator, wherein the means for changing the speed ratio includes a planetary gear set according to claim 1.

8. The servomotor system according to claim 7, wherein the mechanical arrangement comprises the planetary gear set in an accessible separate unit, and the remainder of the mechanical arrangement includes a reducing device, including a screw and a wheel, which is positioned in a lubricated compartment.

9. A planetary gear set comprising a plurality of rotary components mounted in at least one assembly configuration in a case and producing a speed ratio of the planetary gear set, between an input member and an output member, wherein the rotary components allow changes in assembly configuration, and each assembly configuration produces a specific predetermined speed ratio, comprising, between the input and output members, an assembly of rotary components including a sun gear, a planet carrier for planetary gears, and a crown, wherein an assembly configuration is changeable by blocking, within the case, at least one of the rotary components of the assembly, wherein the set has three blocking positions, in which respectively the sun gear, or the crown is blocked by pins introduced through holes in the front holes of the housing, and the planetary carrier is blocked by stop elements on the inner cylindrical surface of the case.

* * * * *